United States Patent [19]

Bush

[11] Patent Number: 5,584,232

[45] Date of Patent: Dec. 17, 1996

[54] PORTABLE OVEN

[76] Inventor: Charles T. Bush, 1521 E. Franklin St. #A103, Chapel Hill, N.C. 27514

[21] Appl. No.: 548,898

[22] Filed: Oct. 26, 1995

[51] Int. Cl.⁶ .............................. A21B 1/00; A47J 37/00
[52] U.S. Cl. ................... 99/340; 99/354; 99/357; 99/413; 99/442; 99/449; 126/275 R
[58] Field of Search ........................ 126/275 R, 19 R, 126/19 M, 369, 373, 377; 99/340, 354, 357, 416, 413, 422, 442, 449

[56] References Cited

U.S. PATENT DOCUMENTS

| | | |
|---|---|---|
| 401,261 | 4/1889 | Fricker . |
| 2,001,615 | 5/1935 | Karten . |
| 2,511,682 | 6/1950 | Allen . |
| 2,568,637 | 9/1951 | Jardim . |
| 3,428,039 | 2/1969 | Desmoulins . |
| 3,892,222 | 7/1975 | Darbo . |
| 3,987,719 | 10/1976 | Kian .................. 126/275 R X |
| 4,014,315 | 3/1977 | Lagunilla . |
| 4,051,836 | 10/1977 | Lagunilla-Leca . |
| 4,320,736 | 3/1982 | Sharon .................. 126/19 M |
| 5,195,500 | 3/1993 | Lerner .................. 126/19 M X |
| 5,235,904 | 8/1993 | Ludena .................. 99/413 |
| 5,287,798 | 2/1994 | Takeda .................. 99/413 |

FOREIGN PATENT DOCUMENTS 0993517  11/1951  France .................. 126/275 R

Primary Examiner—David Scherbel
Assistant Examiner—Reginald L. Alexander

[57] ABSTRACT

There is disclosed a multi-piece portable oven having an oven body (22), a baking mold (24), and a cover (28). Oven body (22) has and upwardly extending cylindrical sidewall (34) and a substantially flat bottom (32). Baking mold (24) has an upwardly extending cylindrical sidewall (38) and a substantially flat bottom wall (40) with an upwardly extending frusto-conical opening (44) at the center thereof. Baking mold (24) is placed inside oven body (22) for baking and steaming. Cover (28) has a circular configuration and downwardly extending peripheral edge (42) that is adapted to provide a tight fit over the baking mold (24) and oven body (22). The portable oven is adapted to be placed on top of a gas stove or electric range. The direct heat of the flame on the oven body will heat the air inside the portable oven and cause the food inside to be cooked or baked.

2 Claims, 2 Drawing Sheets

PORTABLE OVEN

BACKGROUND

1. Field of Invention

This invention relates to an oven, specificly to a portable oven that cooks food by heating the oven over an open flame or burner.

2. Description of Prior Art

Various camping ovens have been developed, they are generally of the type which use folding metal sheets used as reflectors to concentrate an oven region within the reflectors. They are relatively heavy, bulky and not particularly suited for backpacking, bicycling, canoeing and other back-country travel.

Inventors have created other types of ovens designed for use over an open flame. U.S. Pat. No. 4,320,736 to Sharon (1982) discloses a complex oven for stove top cooking formed of an annuler base, a ting shaped main pan, and a lid. A second pan is also described, the secondary pan being placed in the upper portion of the main pan. This oven is hardly compact or light weight enough for use during back-country travel. Lerner (1993) was awarded U.S. Pat. No. 5,195,500 which discloses a complex oven formed of a high temperature convection dome, covered pot, reflector collar, and heat diffuser. The components are assembled to provide a convection path for heat to surround an oven device. This oven is complicated to use and lacks versatility for food preparation tasks other than baking.

The disadvantages of the prior art ovens are that they are heavy, bulky or contain many cumbersome parts. This can provide serious constraints to those who are under restrictions as to the amount of weight they can or are willing to carry with them, such as on a backpacking trip. Furthermore, prior art ovens have limited use for other tasks of food preparation such as boiling water, steaming foods or heating sauces. All portable ovens heretofore suffer from a number of disadvantages:

(a) Production cost is high.

(b) They are large or heavy.

(c) They are complicated to use.

(d) Food being cooked does not brown.

(e) Food being cooked becomes charred or burnt.

(f) They contain a large number of cumbersome parts.

(g) They have limited use for food preparation tasks other than baking.

OBJECTS AND ADVANTAGES

Accordingly, several objects and advantages of my invention are:

(a) to provide a portable oven that is lightweight;

(b) to provide a portable oven that has few parts to maintain and carry;

(c) to provide a portable oven that prepares a variety of foods in addition to baking;

(d) to provide a portable oven that is inexpensive to manufacture;

(e) to provide a portable oven that produces consistent results without burning food;

(f) to provide a portable oven that is compact and easy to carry;

(g) to provide a portable oven that is simple to use.

One of the primary advantages of the invention is that the portable oven can be used to prepare a variety of foods. The separate components of the oven can be used independently to perform most cooking tasks including boiling, steaming, and baking. The invention is not only simple, but also eliminates the need for multiple utensils for meal preparation.

The present invention finds particular utility when used as a portable cookset by campers and backpackers. The versatility and ease of use of the portable oven provide many meal preparation options in a lightweight and compact unit. This is achieved in an efficient manner without the need to use heavy, and relatively bulky metal sheet reflectors or complicated insulated covers and heat diffuses to create an oven environment.

Other features and advantages of the invention will become apparent from the following description in which the preferred embodiments have been set forth in detail in conjunction with the accompanying drawings.

DRAWING FIGURES

Figure 1:
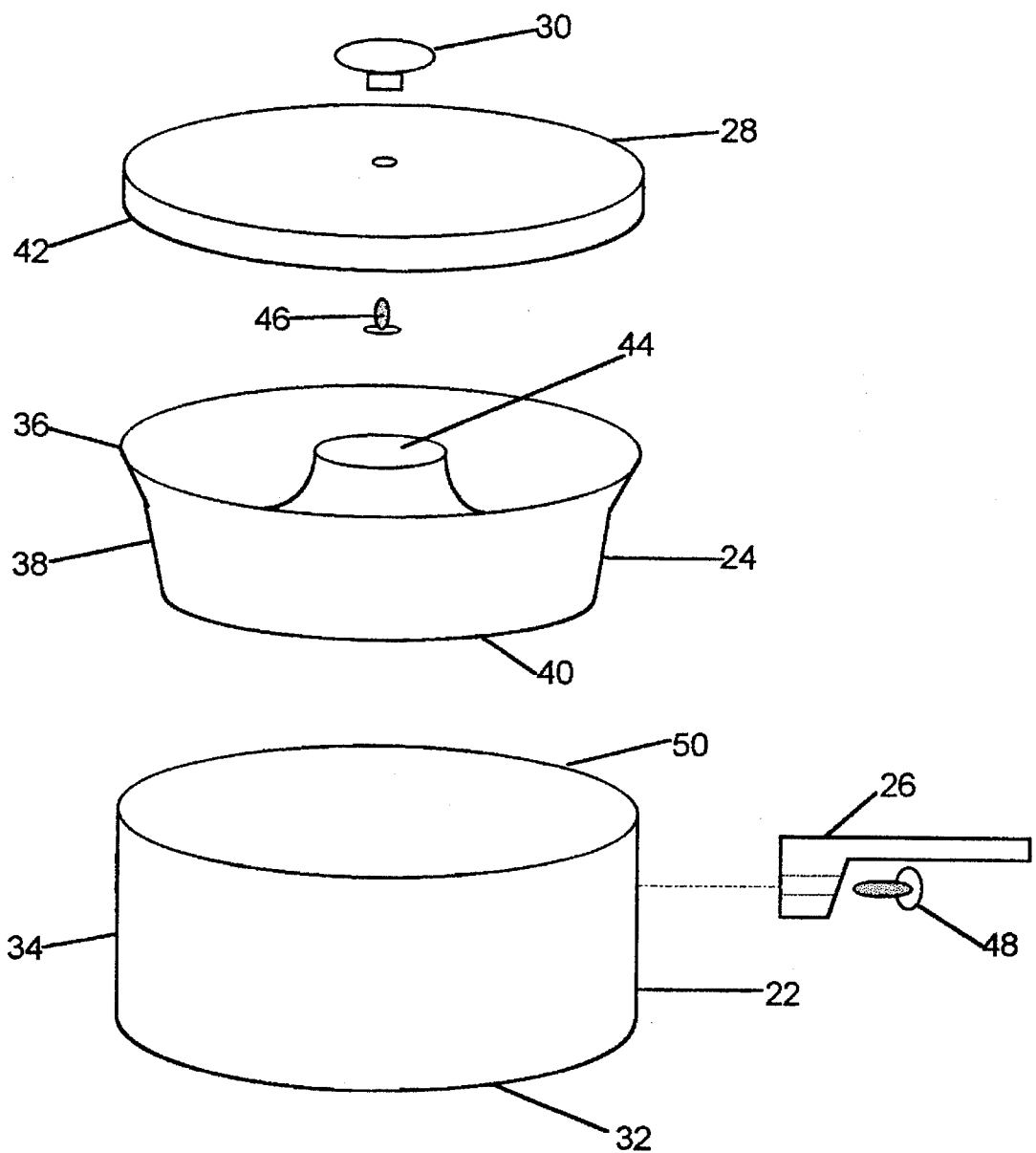
FIG. 1 shows an exploded view of the portable oven.

| Reference Numerals In Drawings | |
| --- | --- |
| 22 oven body | 36 superior edge of baking mold |
| 24 baking mold | 38 sidewall of baking mold |
| 26 handle | 40 bottom wall of baking mold |
| 28 cover | 42 skirt of cover |
| 30 knob | 44 opening of baking mold |
| 32 bottom wall of oven body | 46 screw |
| 34 sidewall of oven body | 48 thumbscrew |
| | 50 superior edge of oven body |

SUMMARY

Accordingly, the reader will see that this portable oven provides a simple, portable device for baking over an open flame or burner. In addition, my portable oven is versatile in that it provides a method for steaming. Also, parts can be used independently for cooking tasks other than baking thereby decreasing the number of utensils needed for meal preparation.

Figure 2:
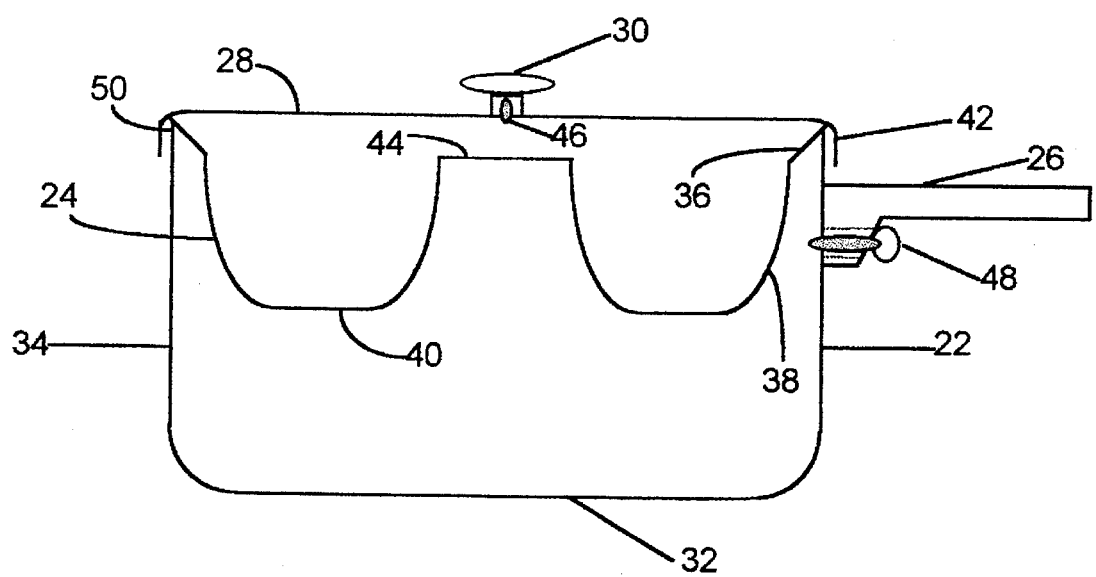
FIG. 2 shows a crossectional view of the portable oven showing the combination of oven body, baking mold, and cover.

Description—FIGS. 1 and 2

A typical embodiment of the portable oven of the present invention is illustrated in FIG. 1 (exploded view) and FIG. 2 (crossection) comprising an oven body 22, a baking mold 24, and a cover 28. Oven body 22 is of a construction identical to an ordinary cooking pot having a vertically extending sidewall 34 and a substantially flat bottom wall 32. Oven body 22 is made, for example, of one sixteenth inch thick spun steel or aluminum and is formed by way of example to have a diameter of eight inches and a height of five inches. Oven body 22 operates as a heat accumulator and deflector by allowing air being heated by gas flame or electric burner (not shown) to rise upward through frusto-conical opening 44 in baking mold 24. In this manner the oven's main baking chamber is heated indirectly by the flame and charring of the food being cooked becomes unlikely.

Oven body 22 can be used independently to boil water, cook foods and heat sauces. When used with baking mold 24 and cover 28 (FIG. 2) it can be used to bake breads or pizza, steam flee, and rehydrate dry foods.

In order to provide a method whereby oven body 22 can be held, a handle 26 is placed on the upper portion of sidewall 34. Handle 26 is fixed to oven body 22, by way of example, in a temporary manner by thumbscrew 48.

Baking mold 24 has a circular configuration with a vertically extending sidewall 38 and a substantially flat bottom wall 40. The central portion of bottom wall 40 of baking mold 24 has a vertically extending frusto-conical opening 44. Opening 44, for example, is two inches in diameter and provides a path by which heated air circulates around food being cooked. Baking mold 24 rests against oven body 22 by contact between outside wall 38 of baking mold 24 and superior edge 50 of oven body 22. This contact may be facilitated by a flange or rolled lip on superior edge 36 of baking mold 24. Dimensions are such to allow bottom wall 40 of baking mold 24 to suspend a substantial distance from bottom wall 32 of the oven body 22 (FIG. 2) thereby minimizing the potential for charting of food being cooked.

Baking mold 24 is of a similar construction and material as oven body 22 and formed, by way of example, to have a height of two and one-half inches and a diameter of eight inches at superior edge 36 and diameter of six inches at bottom wall 40. This tapering of vertical wall 38 provides additional space for heated air to circulate around food being cooked.

Cover 28 has a circular configuration and is of similar construction and material as oven body 22 and has a downwardly extending peripheral edge 42 or skirt. Downwardly extending peripheral edge 42 of cover 28 facilitates a tight fit between baking mold 24, oven body 22, and cover 28. To provide a method by which cover 28 can be held, a knob 30 is placed in the central portion of cover 28.

From the description above, a number of advantages of my portable become evident:

(a) Versatile components obviate the need to carry several utensils for multiple cooking tasks.

(b) Fewer parts provide simple operation and less weight.

(c) Simplicity of design generates less production cost.

(e) Indirect heating minimizes the risk of charring foods being cooked.

Operation—FIG. 2

Grease baking mold 24 with oil, butter or margarine. Place food to be cooked in baking mold 24. Baking mold 24 is then placed inside oven body 22 and cover 28 applied. Baking mold 24 rests inside oven body 22 by contact between superior edge 36 of baking mold 24 and superior edge 50 of oven body 22 (FIG. 2). The flame of the burner is lowered to about one-half inch and the portable oven as assembled in FIG. 2 is placed over the flame. The oven is then allowed to be heated up to the moment wherein the food is cooked. Examples of types of foods that can be cooked include; muffins, brownies, biscuits, pizza, pies, and quiche.

Other types of operations can be readily carried out depending on the type of food to be cooked. Vegetables or dee can be steamed in baking mold 24 by bringing water to a boil in oven body 22 and placing baking mold 24 into oven body 22 and applying cover 28.

More than one food can be cooked simultaneously. Cornbread, for example, can be prepared in baking mold 24 while beans and rice simmer in oven body 22. Oven body 22 can also be used as and ordinary saucepan to boil water, cook foods and heat sauces.

Summary, Ramifications, and Scope

Thus the reader will see that the portable oven of the present invention provides a highly reliable, lightweight and economical device that is simple to use to prepare a variety of foods in a variety of settings.

While my above description contains many specifications, these should not be construed as limitations on the scope of the invention, but as an exemplification of one preferred embodiment thereof. Many other variations are possible. For example, one or two handles can be used on the oven body. Alternatively, no handle may be used and the oven moved from one place to another by using a universal pot grip. The sidewalls of the oven body can be vertical or angled. In addition, an insulating cover can be used to decrease fuel consumption. The cover can be convex or flat. The covers peripheral edge can extend downwardly on the inside edge of the oven body. The center opening in the baking mold can be one or multiple. The superior edge of the baking mold can be flared or rolled. A non-stick coating can be applied to aid cleaning.

Thus the scope of the invention should be determined by the appended claims and their legal equivalents, rather than by the examples given.

I claim:

1. A portable camping oven comprising:

a) a main pot-type cooking oven having a closed bottom and a surrounding wall structure;

b) a ring-shaped baking structure suspended within the oven and spaced above the closed bottom of the oven, said baking structure having an upwardly extending side wall and flat bottom wall with a frusto-conical opening in the center of said bottom wall;

c) wherein there is defined a lower open unobstructed space between the closed bottom of the oven and the baking structure;

d) a cover supported on the cooking oven so as to define an upper open unobstructed space between the baking structure and the cover; and e) wherein the ring-shaped baking structure forms a vertical air passageway that permits air to move between the upper and lower open spaces and through the vertical air passageway.

2. The portable camping oven of claim 1 wherein the camping oven is provided with a removable handle that is securable to the main pot-type cooking oven.

\* \* \* \* \*